T. VAN ALLER.
ELECTRIC OVEN.
APPLICATION FILED MAY 28, 1906.

917,195.

Patented Apr. 6, 1909.
2 SHEETS—SHEET 2.

WITNESSES
W. Ray Taylor
Helen Oxford

INVENTOR.
TYCHO VAN ALLER.
by Albert G. Davis
Atty

UNITED STATES PATENT OFFICE.

TYCHO VAN ALLER, OF SCHENECTADY, NEW YORK, ASSIGNOR TO GENERAL ELECTRIC COMPANY, A CORPORATION OF NEW YORK.

ELECTRIC OVEN.

No. 917,195.　　　Specification of Letters Patent.　　　Patented April 6, 1909.

Application filed May 28, 1906. Serial No. 319,071.

*To all whom it may concern:*

Be it known that I, TYCHO VAN ALLER, a subject of the King of Denmark, residing at Schenectady, county of Schenectady, State of New York, have invented certain new and useful Improvements in Electric Ovens, of which the following is a specification.

This invention relates to electric heaters and has for its object the provision of a device of this character which is adapted for many uses both in atmospheric heating and cooking, and which is simple and compact of construction and at the same time safe and durable.

My invention relates more specifically to electric heating devices to be used in cooking, although my device may be quickly adapted for use as an atmospheric heater.

One of the objects of my invention is to provide an electric cooking device in which the material to be heated is brought up to the proper temperature to effect the cooking in the minimum time without making direct contact with the heating surfaces.

In carrying out my invention I provide a device which may be used as a broiler or the like, and which, while it is like an oven in many respects, is so constructed and arranged that it will operate as a broiler but will not touch the metallic heating surfaces.

My invention comprises an inclosed casing having a longitudinal passageway, on each side of which are coils arranged in parallel vertical planes. Between these two heating planes I have arranged to suspend the material to be heated or broiled, the coils being very close to but not touching the material. The coils constituting the vertical heating planes are horizontal and in order that more heat shall be generated in the bottom of the planes than in the top I arrange the lower coils closer together.

Further objects of my invention will appear in the course of the following specification, and my invention may, therefore, be said to consist in the features of construction and in the arrangement and combination of elements hereinafter set forth and particularly pointed out in the claims annexed hereto.

Figure 1:
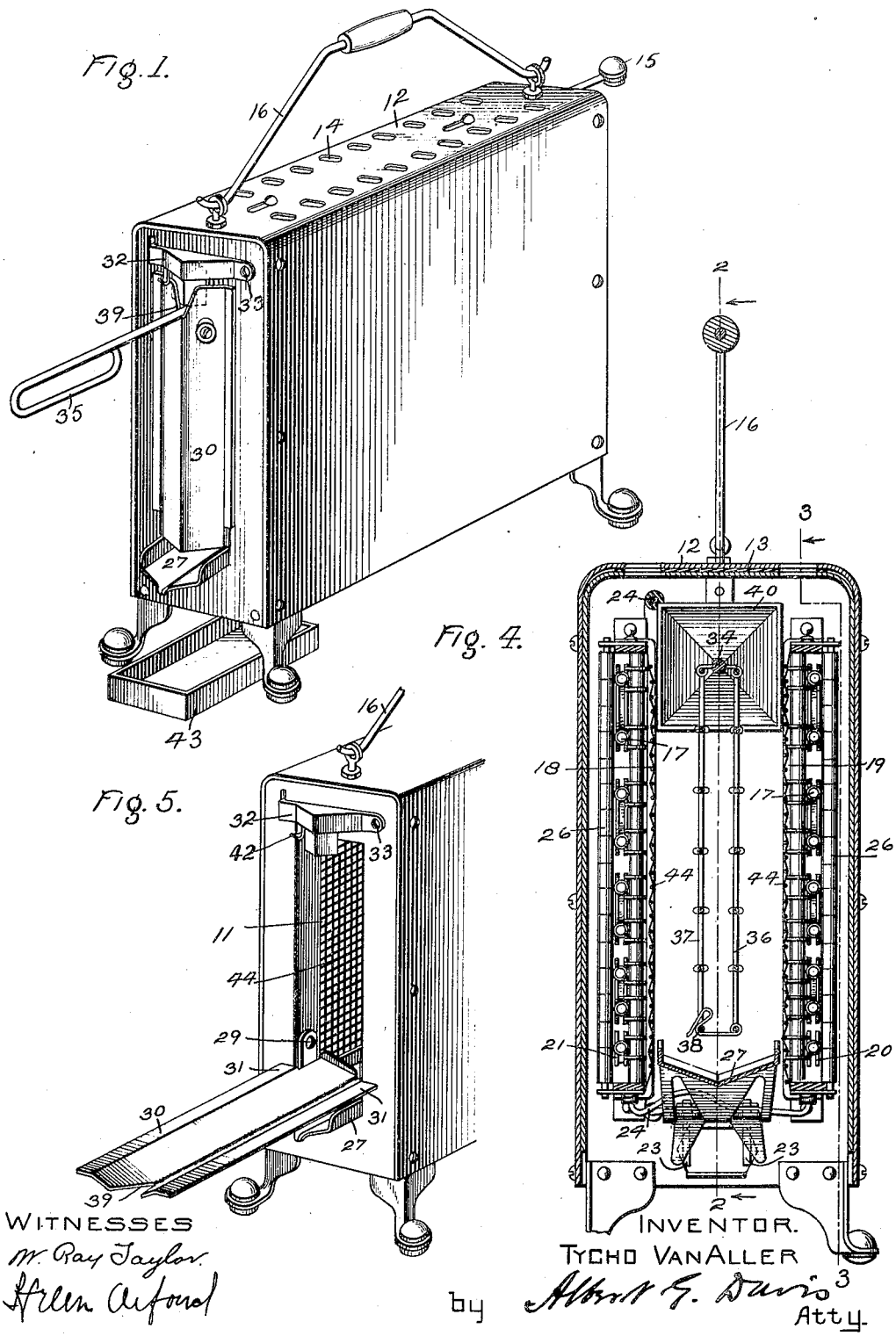
Figure 2:
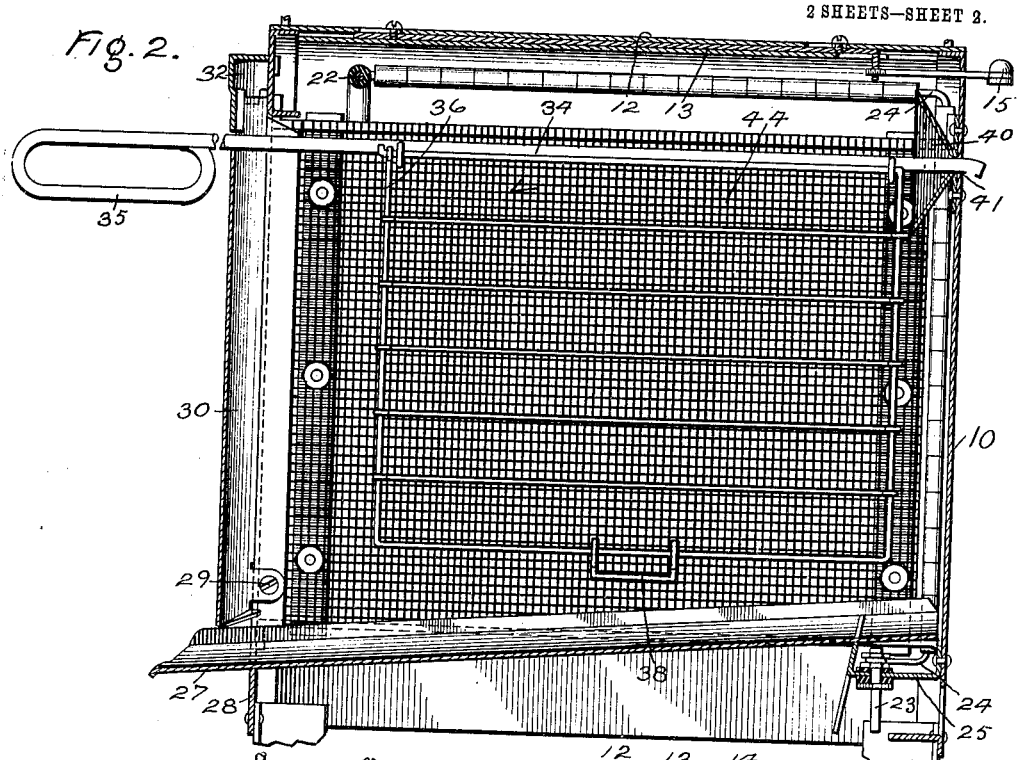
Figure 3:
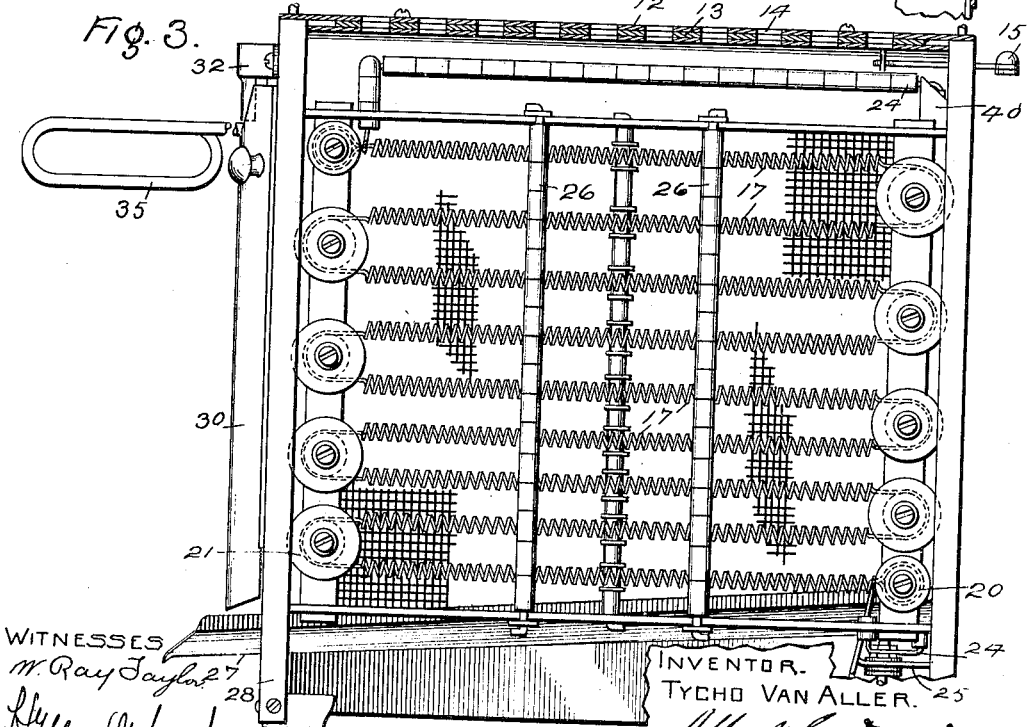

In the drawings, in which I have shown one embodiment of my invention, Figure 1 is a perspective view of my complete device; Fig. 2 is a sectional view thereof taken on the line 2—2 of Fig. 4; Fig. 3 is a sectional view taken on the line 3—3 of Fig. 4; Fig. 4 is a central transverse section of my device; and Fig. 5 is a fragmentary perspective view showing the open end of the device.

Referring to the drawings, 10 is a casing of metal, such as sheet iron, entirely inclosed except for openings in the end 11 and the bottom. The top of the device 12 is closed, but by means of a slide 13 having perforations coöperating with perforations 14 in the casing, a circulation of air through the device may be obtained. In case it is desired to use my heater for atmospheric heating instead of for cooking purposes or when it is desired to regulate the heat within the casing, the slide is operated by means of the handle 15. A handle 16 is secured to the top of the casing for convenience in carrying it from place to place. Arranged longitudinally of the casing is a series of heating coils 17, which may be of any desired form but are preferably arranged horizontally so as to constitute two vertical heating planes 18 and 19. These coils are separated by a distance sufficient to permit the insertion of a material to be heated, the material preferably being suspended in place by means of a holder, such as is sometimes used for toasting or for steak broiling. One of the important features of my invention I consider to be the arrangement of these coils horizontally, so that by so doing means are provided whereby a more uniform temperature throughout the heating planes may be maintained. To bring about this result, I arrange the heating coils in the lower part of the plane closer together than the upper portion; or, in other words, the distance between the coils gradually increases from the bottom to the top. In this manner the upper coils, which would naturally be heated the most due to the convection of the heat upward from the lower coils, will be maintained at substantially the same temperature as the lower coils. Other means of bringing about this result may, of course, be employed without departing from the spirit of my invention. In the particular arrangement shown in the drawings the two sets of coils are arranged in parallel and traverse back and forth from the lower insulating stud 20, around the insulating stud 21, the wire being arranged in spirals between the various insulators. From the top spiral the wire 22 crosses over on to the other plane and traverses back and forth downward, both ends being brought to one of the terminals 23 mounted in and insulated from bracket 25, while the other terminal connects with cross wire 22 by means of wire 24.

As a means for strengthening the coils in the vertical plane, I provide the insulated braces 26. Between the two heating planes and at the bottom of the coils is a trough 27, which at its rear end rests on the bracket 25 and at its forward end rests in the casing at 28. This trough has an inclination downward toward the opening at the front of the casing and the bracket 25 is inclined so as to assist the trough into it when the latter is pushed backward and strikes the face of the bracket. Pivoted to the front end 11 of the casing at 29 is a door 30, which is made trough-shaped as shown and is adapted to swing downward and outward. This door is provided with shoulders 31, arranged so that when the door is dropped they will abut against the end casing 11 to maintain the trough in a position inclined slightly downward toward the pivotal point. By this arrangement the juices and liquids which come from the viands which are cooked will run backward through the trough 30 into the trough 27. A latch 32, pivoted at 33, is provided above the door 30 for latching the same in place.

For the purpose of suspending the material to be cooked between the heating planes, I provide a holder which preferably consists of a rod 34 having a handle 35 and having pivotally suspended therefrom a pair of wire frames 36 and 37 adapted to be latched at 38 so as to center themselves between the heating units. This rod 34 is supported at its forward end by the door 30, which is cut V-shaped at 39 for that purpose. At the rear end the rod is supported in the casing and, in order that it will be thrust into the hole in the casing without difficulty, I provide a cone-shaped guide 40 which terminates in a hole 41 in the casing, so that by simply thrusting the rod in it will engage the side of the cone and be guided through the casing.

To use my device, the viand which is to be cooked or broiled is latched between the frames 36 and 37. The rod is then thrust into the hole in the casing at 41 and the door is lifted so as to support the front end of the rod. When it is desired to remove the viand or to examine the same, the handle 35 is slightly raised and by engaging the projection 42 on the latch the latter is raised and the door 30 will drop so as to assume the position shown in Fig. 5. The frame may then be withdrawn and held over the door 30 which, being trough-shaped and inclined backward, will convey the juices into the trough 27. This trough 27 also acts to convey the juices which are produced in process of cooking to the forward end where they may be gathered in a suitable receptacle 43. The trough 27 being removable may be kept clean, while the screens 44 will protect the heating coils from injury or from short-circuiting in any manner.

When it is desired to use the device as an atmospheric heater, or for adjusting the heat while broiling, the slide 13 is moved until the perforations therein register with the perforations 14 and a circulation of air through the heater is produced.

It will thus be seen that I have produced a device which is susceptible of a wide range of uses. By the arrangement of coils above described the temperature throughout the area to be heated is maintained uniform, while the arrangements of parts, such as the troughs, etc., is such as to constitute a very convenient and simple device which can be produced at a small expense and can be kept clean without difficulty.

It should be understood that the arrangement which I have above described is illustrative merely and that many changes may be made therein without departing from the spirit of my invention, the scope of which is set forth in the claims annexed hereto.

What I claim as new and desire to secure by Letters Patent of the United States, is:—

1. An electric heater, comprising a casing having heating coils therein arranged in vertical adjacent planes, and means for pivotally supporting the material to be heated intermediate said planes.

2. An electric heater, comprising a casing having a series of horizontal coils arranged in vertical parallel planes adjacent each other, and means for pivotally supporting the material to be heated intermediate said planes.

3. An electric heater, comprising a casing having heating coils arranged in vertical adjacent planes, means for pivotally supporting the material to be heated intermediate said planes, and means for regulating the temperature within said casing.

4. An electric heater, comprising a casing having heating coils arranged in vertical adjacent planes, means for pivotally supporting the material to be heated intermediate said planes, and means for opening said casing to admit a circulation of air therethrough.

5. An electric heater, comprising a casing having a series of horizontal coils arranged in vertical parallel planes, means for pivotally supporting the material to be heated intermediate said planes, and means for opening the top of said casing at will to permit a circulation of air therethrough.

6. An electric heater, comprising a casing having heating coils therein arranged in vertical parallel planes, and a holder for the material to be heated, pivotally and removably mounted intermediate said planes.

7. An electric heater, comprising a casing having heating coils therein arranged in vertical parallel planes, means for pivotally supporting the material to be heated intermediate said planes, and a removable trough under said supporting means.

8. An electric heater, comprising a casing having a door at one end thereof, heating coils therein arranged in vertical parallel planes, means for supporting the material to be heated intermediate said planes, and a removable trough under said supporting means and inclined downward toward said door.

9. An electric heater, comprising a casing having heating coils therein arranged in vertical parallel planes, a holder for supporting the material to be heated removably mounted in said casing, and a trough-shaped door arranged to open outward and downward and having an inclination downward toward the casing when opened.

10. An electric heater, comprising a casing having heating coils therein arranged in vertical parallel planes, a holder for supporting the material to be heated removably mounted in said casing, and a guide for guiding said holder into the casing.

11. An electric heater, comprising a casing having heating coils therein arranged in vertical parallel planes, a holder for supporting the material to be heated removably mounted in said casing, a trough under said holder, and a trough-shaped door arranged to open downward and outward and have an inclination downward toward the trough when opened.

12. An electric heater, comprising a casing having heating coils therein arranged in vertical parallel planes, a removable holder for supporting the material to be heated, and a trough-shaped door opening downward and outward and forming a support for the holder.

13. An electric heater, comprising a casing having heating coils therein arranged in vertical parallel planes, a holder for supporting the material to be heated, a removable trough under said holder, and a trough-shaped door arranged to open downward and outward and have an inclination downward toward the trough when open, said door forming a support for the holder at one end and the casing acting as a support at the other.

14. An electric heater, comprising a casing having horizontal heating coils therein arranged in vertical parallel planes so that the heat generated gradually decreases from the bottom coil upward, a holder for supporting the material to be heated, a removable trough under said holder, a trough-shaped door arranged to open downward and outward and have an inclination downward toward the trough when open, said door forming a support for the holder at one end, and means for guiding the said holder into the casing at the other.

In witness whereof, I have hereunto set my hand this 25th day of May, 1906.

TYCHO VAN ALLER.

Witnesses:
  HELEN ORFORD,
  G. C. HOLLISTER.